(12) United States Patent
Dilber et al.

(10) Patent No.: US 11,448,345 B2
(45) Date of Patent: Sep. 20, 2022

(54) COUPLING

(71) Applicant: Precision Couplings LLC, Houston, TX (US)

(72) Inventors: Halit Hussein Dilber, Katy, TX (US); Michael Keith Nations, Jr., College Station, TX (US)

(73) Assignee: Precision Couplings LLC

( * ) Notice: Subject to any disclaimer, the term of this patent is extended or adjusted under 35 U.S.C. 154(b) by 0 days.

(21) Appl. No.: 17/100,135

(22) Filed: Nov. 20, 2020

(65) Prior Publication Data

US 2022/0163144 A1 May 26, 2022

(51) Int. Cl.
*F16L 15/06* (2006.01)
*E21B 17/042* (2006.01)
*F16L 15/00* (2006.01)

(52) U.S. Cl.
CPC .......... *F16L 15/06* (2013.01); *E21B 17/0423* (2013.01); *F16L 15/001* (2013.01)

(58) Field of Classification Search
CPC ..... F16L 15/002; F16L 15/004; F16L 15/009; E21B 17/0423

USPC .......................................................... 285/333
See application file for complete search history.

(56) References Cited

U.S. PATENT DOCUMENTS

| | | | | |
|---|---|---|---|---|
| 5,066,052 A | * | 11/1991 | Read ..................... | F16L 15/004 285/334 |
| 10,428,594 B2 | * | 10/2019 | Zhu ....................... | E21B 17/042 |
| 10,697,251 B2 | | 6/2020 | Juarez | |
| 2004/0084901 A1 | * | 5/2004 | Church ............... | E21B 17/0423 285/333 |
| 2014/0084582 A1 | * | 3/2014 | Elder .................. | E21B 17/0423 285/334 |
| 2015/0240570 A1 | * | 8/2015 | Oku .................... | E21B 17/0423 285/334 |
| 2017/0101830 A1 | * | 4/2017 | Inose .................... | F16L 15/00 |
| 2019/0032820 A1 | * | 1/2019 | Inose ................... | F16L 15/002 |
| 2019/0195029 A1 | | 6/2019 | Juarez | |

* cited by examiner

*Primary Examiner* — David Bochna
(74) *Attorney, Agent, or Firm* — Ewing & Jones, PLLC

(57) ABSTRACT

A non-frustoconical coupling provides a mechanical connection used in fluid transport for hydrocarbon recovery operations.

19 Claims, 12 Drawing Sheets

COUPLING

FIELD OF THE DISCLOSURE

Aspects of the disclosure relate to threaded tubular joints usable in the oil and gas well drilling and production, such as tubing, casing, line pipe and drill pipe, commonly known collectively as oilfield tubular goods. More particularly, aspects of the disclosure relate to a tubular joint for connecting male pin and female box members for tubulars.

BACKGROUND

Continuity of fluid handling operations is exceptionally important in some industries. In the hydrocarbon recovery industry, operations must take into account personnel safety, environmental safety and economic efficiency. As time progresses, hydrocarbon reserves that are easy to access decrease. The remaining hydrocarbon reserves are difficult to access due to a number of factors. Generally, these hydrocarbon reserves are deeper or more remote geographically. When the reserves are located deeper below the surface, pressures and heat increase for the operations attempting to access the reserves.

Coupling technology must allow for operators to tap into the hydrocarbon reserves, minimizing the chance of mechanical failure of the coupling over time. In addition to performing the fluid transfer functions, these couplings must also provide for environmentally safe and economical operations.

Conventional apparatus may provide for different types of technology for establishing a connection in a piping network, however these conventional apparatus may be very expensive to produce in a machine shop. Other conventional apparatus may be difficult to install in the field. In some embodiments, the couplings cannot withstand the forces required for certain hydrocarbon fields. In other embodiments, the couplings are cumbersome to establish, thereby economically limiting operators due to the time constraints for establishing such connections.

Conventional wedge threads, by definition, have different stab flank lead and load flank leads in the range of (0.003 to 0.012 inch/inch). Wedge threads with small differences in the stab flank lead and load flank lead (0.003 to 0.0008 inch/inch), can cause large axial distance variations before wedge like engagement. Wedge threads with small differences in the leads are desired to reduce the amount of material removed and reduce the machining time. Frustoconical seal engagement, also known as tapered seal engagement, leads to unreliable interference on seals which have wedge threads. If the design is too far forward axially, the interference becomes too great. If the design provides a configuration that is too far backward, the interference is too little to effect sealing. In an effort to compensate for this variability, extra length and interference must be added due to the variable position of the seal. This generally leads to conical sections with small tapers. Prior art for conventional apparatus teaches taught seals on tapered planes. Frustoconical, curvilinear to conical, or curvilinear to curvilinear seals are taught that are constructed on a tapered plane. Tapered seals are favored due to the ease at which they can be made on a lathe and their ability to slide together. Most connections utilize shoulders which limit axial advancement which in turn controls radial interference. Aspects of the current disclosure, different than the conventional designs, use the wedging of the threads alone to limit axial advancement and require a seal more adapted to this purpose.

In order to understand the reasoning behind different seal constructions, the magnitude of the axial variation must be understood. A 0.001 inch machining tolerance in the lead would cause a 0.177 inch axial variation for a wedge stab flank of 0.250 and wedge load flank of 0.260 inch. A thread forming tool tolerance of 0.001 inch would cause a 0.026" axial variation. These are standard tolerances and are additive. A conical seal with a modest $1/16$ ratio taper (1.8 degrees) would develop 0.0127 inch of diametric interference positive or negative (0.203 in./16–0.0127 in). The normal range for sealing oilfield country tubular goods is between 0.008 inches and 0.045 inches of diametric interference. This example demonstrates the need to abandon frustoconical designs in order to stabilize the seal interference necessary for proper sealing. Proper sealing is a safety issue and of paramount importance for high pressure fracking operations.

Frustoconical seals lead to damage of the wedge threads adjacent to the seal. The increased interference and conical shape acts like a ramp which causes radial stresses that act to disengage the threads.

A non-frustoconical seal or longitudinal central axis seal also allows for stronger connection designs. Frustoconical seals consume pipe wall thickness that can be used for torque, thread bearing strength and connection tensile pull strength. A toroidal o-ring used as a seal on a shaft would be an example of a simple longitudinal central axis seal.

There is a need to provide a seal other than the aforementioned and problematic frustoconical seal, eliminating the drawbacks discussed above.

There is a need to provide an apparatus and methods for coupling of mechanical piping systems that are easier to operate than conventional apparatus and methods.

There is a further need to provide apparatus and methods that do not have the drawbacks discussed above, namely, wasted field make-up time and capital cost of the coupling.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one embodiment, a coupling is described. The coupling may comprise a box member with at least one opening in the box member, the box member comprising a first curvilinear surface, the box member configured with a first set of box member threads and a second set of box member threads. The coupling may further comprise a pin member configured to be inserted into the box member comprising a second curvilinear surface. The coupling may be further configured wherein the pin member is configured with a first set of pin member threads and a second set of pin member threads. In this embodiment, the first curvilinear surface and the second curvilinear surface are configured to interface and wherein the first curvilinear surface and the second curvilinear surface share a same longitudinal central axis. The coupling may be configured wherein an apex of one of the first curvilinear surface and the second curvilinear surface is configured such that an axial placement limits a diametric interference between the first curvilinear surface and the second curvilinear surface. The coupling may also be configured wherein a radial seal is formed from an intersection of the first curvilinear surface and the second curvilinear surface and wherein the first set of box member threads is configured to form a first interface with the first set of pin member threads and the second set of box member threads are configured to form a second interface with the second set of member threads.

In one embodiment, a coupling is described. The coupling may comprise a box member with at least one opening in the box member, the box member comprising a first curvilinear surface, the box member configured with a first set of box member threads and a second set of box member threads. The coupling may further comprise a pin member configured to be inserted into the box member. The coupling may further comprise a second curvilinear surface, and wherein the pin member is configured with a first set of pin member threads and a second set of pin member threads. The coupling may be further configured wherein the first curvilinear surface and the second curvilinear surface are configured to interface, wherein the first curvilinear surface and the second curvilinear surface share a same longitudinal central axis. The coupling may be further configured wherein an apex of one of the first curvilinear surface and the second curvilinear surface is configured such that an axial placement limits a diametric interference between the first curvilinear surface and the second curvilinear surface and wherein a radial seal is formed from an intersection of the first curvilinear surface and the second curvilinear surface. The coupling may be further configured wherein the first set of box member threads is configured to form a first interface with the first set of pin member threads and the second set of box member threads is configured to form a second interface with the second set of member threads. The coupling may be configured wherein the coupling is configured such that when torque is applied to one of the box member and the pin member, the seal moves from a point of maximum radial interference to a lower minimum interference.

In another embodiment, a coupling is described. In this embodiment, a box member with at least one opening in the box member is described wherein the box member comprises a first curvilinear surface, the box member configured with a first set of box member threads and a second set of box member threads. The coupling may further comprise a pin member configured to be inserted into the box member comprising a second curvilinear surface. The coupling may be further configured wherein the pin member is configured with a first set of pin member threads and a second set of pin member threads. The coupling may be further configured wherein the first curvilinear surface and the second curvilinear surface are configured to interface, wherein the first curvilinear surface and the second curvilinear surface share a same longitudinal central axis. The coupling is further configured wherein an apex of one of the first curvilinear surface and the second curvilinear surface is configured such that an axial placement limits a diametric interference between the first curvilinear surface and the second curvilinear surface. The coupling is further configured wherein a radial seal is formed from an intersection of the first curvilinear surface and the second curvilinear surface and wherein the first set of box member threads is configured to form a first interface with the first set of pin member threads. The coupling is further configured wherein the second set of box member threads is configured to form a second interface with the second set of member threads, and wherein at least one of the first set of pin member threads, the second set of pin member threads, the first set of box member threads and the second set of box member threads are tapered threads.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not to be considered limiting of its scope, for the disclosure may admit to other equally effective embodiments.

Figure 1:
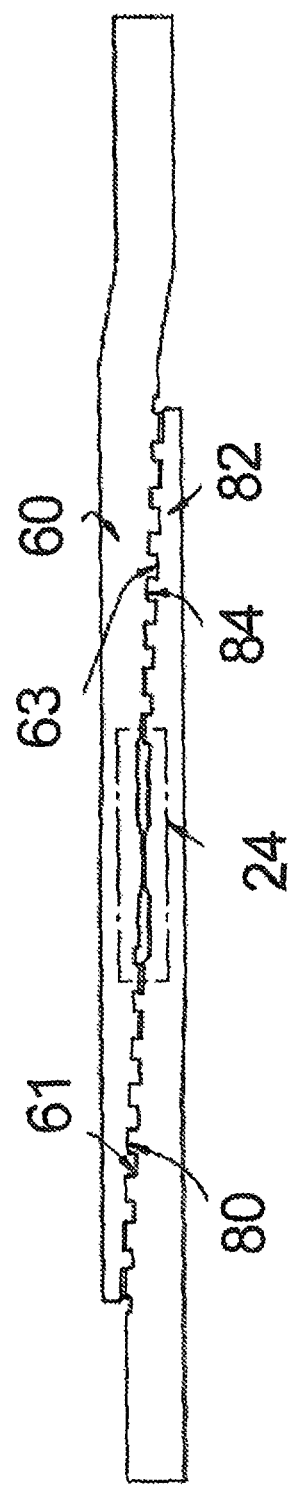
FIG. 1 is a side cross-sectional view of a box and pin arrangement that may be used in tubulars in one example embodiment of the disclosure.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Embodiments of the disclosure relate to a coupling that may be used to connect tubulars together. These tubulars may be used to convey a fluid, such as oil and/or gas from a recovery point to a surface location. Embodiments of the disclosure allow for a robust connection that may be established to carry fluids without leakage. As will be understood, different nomenclature may be used, from time to time, to describe components of such systems. As will be understood, male components and female components may be used to establish such connection. Female components, may be described as a "box connector" into which a male mating component may be inserted. Female components, in some examples, may be threaded to allow for a mechanical connection between the female component and the male component. In embodiments, the female components may be constructed from metals and/or alloys of metals to allow for robust service in anticipated environments.

An improved threaded connection adapted to secure adjacent conduits in a continuous flow conduit forming relationship is disclosed. A thread form and seal combination is presented for maximizing sealing while controlling seal stresses to prevent detrimental tubular hoop stresses and seal surface contact stresses. In some embodiments, a radial seal is disclosed composed of one curvilinear surface interfacing with another curvilinear surface, both of which share the same longitudinal central axis as the tube. Embodiments are described such that axial placement of the apex of the curvilinear surface is performed along the interfacing curvilinear surface within a given length limits the increase of diametric interference between the two surfaces. In embodiments, the radial seal composition may be located between wedge threads proximate to the center between the OD and ID of the connection. The contact area of the two sealing surfaces may form a "mid-seal" between two threaded regions. In embodiments disclosed, the selection of a curvilinear to curvilinear surface contact is performed because non-linear point to point contact is more effective for sealing tubes that may be structurally loaded in a flexed fashion. The geometry of the thread structure described herein is a refinement of the original wedge thread and is designed and controlled to maximize sealing, maximize torque, control the depth of stab and control the speed of assembly. The geometries/features controlled are taper, thread height, stab flank angle, load flank angle, stab flank lead, load flank lead, root to crest contact, flank to flank contact, root and crest corner radii and box and pin thread root and crest radial interference. In embodiments, the thread crests and thread roots come into contact before any contact of the thread flanks forcing the tubular into a round rather than out of round shape. During fastening, the further engagement of the dovetail flanks lock the radial position and desired interference of the seal into place. As torque is applied and the connection is made up tighter and progresses further in the axial direction, the curvilinear seal moves from a point of maximum radial interference to a lower minimum interference. This design allows the increasing hoop stress caused by the tapered threads to be negated or mitigated. The seal interference is controlled in order to prevent galling and leaking which occurs when the radial interference is too high.

The present embodiments improve sealing by controlling the seal diametric interference by utilizing a unique seal geometry and by trapping the seal between two tapered wedge threads.

The present embodiments stabilize the threads under cyclic axial loads of tension and compression, as well as under bending loads, by stab flank and load flank contact, which restricts the movement of the engaged threads.

As used herein, a "pin member" is a male threaded portion of a threaded connection which can comprise external threads. These external threads may interface with other threads in an arrangement. The arrangement, for example, may be a helical arrangement, such that two members may be rotated around a common axis. For example, a pin member can be formed on a tubular or pipe that is round in configuration. The tubular may be empty or may have a conduit or other arrangement inside.

A "pin root" is defined as a valley portion of a pin member. The valley may be trapezoidal in shape. Forms of trapezoidal arrangements may include square or rectangular shapes.

The term "pin thread" as used herein refers to an external thread of a pin member, described above. The pin thread may be configured with different sections, including a load flank, a stab flank, a root and a crest, each of which will be described. For instances of illustration, a pin thread may be a portion of a male member that joins to a corresponding female thread in a threaded connection.

As used herein, a "pin thread tooth" refers to a portion of a pin member that remains after a groove has been cut in material forming the pin or that has been removed in some other fashion. As will be understood, grooves may be established by a threading tool or application of a tap and die arrangement, as non-limiting embodiments. As contained herein, the pin thread tooth has a stab flank, a pin crest and a load flank.

As used herein, the term "taper" is used to refer to an angle forming a trajectory wherein the thread tooth can extend from the longitudinal axis of a pipe. In embodiments that have a male and female portion that are joined together with approximately equal longitudinal axes, the taper may be zero as the male portion of the pin is inserted into the female portion of the box connection.

As used herein, a load flank is a portion of a tooth that carries load once the threaded connection is established. The load flank, for description purposes, is opposite the stab flank that directly contacts over portions of the threaded connection once the male end of a connection is inserted into a female end ("box connection").

As further defined herein, a load flank and a stab flank may be placed in various configurations/angles when establishing a pin thread tooth. Thus, a "flank angle" is used to establish an angle between a stab flank or a load flank (outside surfaces) that extend from the root of the tooth. The flank angle, in some instances, can refer to an acute angle in a plane coinciding with a pipe axis (i.e. longitudinal pipe axis). According to the coordinate definitions, the flank angle is measured between a flank of a box connector and a plane or a flank of a pin member (e.g. a pin stab flank angle) and a plane. In embodiments, the plane can be positioned 90 degrees to the longitudinal pipe axis. By definition, the flank angle is a positive number if the flank faces toward a crest. The flank angle is a negative number if the flank angle faces the root.

As used herein, the term "pin crest" refers to the top or apex of a thread. The pin crest may be trapezoidal, square or rectangular in shape.

As used herein, the term "channel" refers to an opening between a stab flank and next associated load flank of a pin member. A channel can be created from a composition of angles, curves and other surfaces.

As used herein, the term "box thread tooth" refers to a tooth in a box (female) portion of a connection. A "box thread tooth" may have three sides, namely a stab flank, a box crest and a load flank.

As used herein, the term "box crest" can refer to an apex of the thread in a box connection. The apex or crest, for example, may be trapezoidal in shape such as square or rectangular.

As used herein, the term box stab flank refers to a surface of the box thread tooth that can meet a pin stab flank to restrict an axial movement of the threaded connection prior to threading tubulars to establish a threaded connection. The box stab flank creates a resistance to compressive forces once the threaded connection is fully established.

A term "channel", as provided, refers to an opening between stab flanks of the pin member and the box connector. A channel may be any complex shape.

The term "pitch" is the distance measured parallel to the thread axis, between corresponding points on adjacent threads. Unified screw threads are designated in threads per inch. This is the number of complete threads occurring in one inch of threaded length. Pitch and lead are mathematically related in that Pitch=1 inch/Lead in inches. Example: lead=0.200 inch then Pitch=1/0.200=5. The pitch would be 5 threads per inch. 5 revolutions or turns would be required to advance the thread 1 inch axially.

The term "wedge threads" refers to a pin member equipped with dovetail shaped external threads whose pin thread tooth width increases in one axial direction along the pin member, while the box member is equipped with dovetail shaped internal threads whose box thread tooth width increases in the other axial direction. The mating set of helical screw threads provides a wedge like engagement of opposing pin and box flanks that limit the extent of relative rotation between the box and pin members. The rate at which the pin thread tooth or box thread tooth widens depends on the difference between the stab flank and load flank lead of the thread form.

The term "diametric interference" or "interference" describes an interference fit between the sealing surfaces of the seal or between surfaces of the thread form. Interference fits are commonly used on oilfield tubular goods to seal against oil and toxic gases. The interference is engineered to induce compressive stress around the cylinders that are higher than the gas and fluid pressures within the tube. The diameter of the sealing surface on the pin member can be designed larger than the sealing surface of the box member or vice versa. Other terms used to describe diametric interference are "press fit" or "squeeze fit". The pressure resistance of the seal is controlled by the amount of interference. Formulas exist to compute the diametric interference amount that will result in various compressive stresses for sealing based on the material being used the tubular diameters and thicknesses.

The term "hoop stress" or "circumferential stress" is the force exerted circumferentially (perpendicular to the axis and the radius of the object) in both directions on every particle in the cylinder wall. An example of destructive hoop stress would be a burst pipe from high internal pressure. Along with axial stress and radial stress, hoop stress is a component of the stress tensor in cylindrical coordinates. It is a component load of triaxial loading of the walls of a pressure vessel.

The term "curvilinear surface" in geometry describes a coordinate system for Euclidean space in which the coordinate lines may be curved. These coordinates may be derived from a set of Cartesian coordinates by using a transformation that is locally invertible (a one-to-one map) at each point. This means that one can convert a point given in a Cartesian coordinate system to its curvilinear coordinates and back. The name curvilinear coordinates, coined by the French mathematician Lamè, derives from the fact that the coordinate surfaces of the curvilinear systems are curved. In terms of the profile geometry herein the seal surfaces are constructed of curves with respect to the central axis of the tubular. The curves may be composed of arcs and radii or be combined thereof in a tangent configuration. The purpose of the curves is to slide over another curvilinear surface with high contact forces without galling or destructive deformation.

The term "cylindrical surface" is a sealing surface that is linear and parallel to the central axis "centerline" of the tube. In piping technology, the term centerline is the axis which runs longitudinally along the pipe through the midpoint of its diameter.

The term mid seal is the area of the two sealing surfaces formed between two threaded regions on the box and pin members. The area or region where the seals contact when the box and pin members are screwed together and unitized.

Referring to FIG. 1, a mated version of a threaded connection according to one embodiment. The threaded connection includes a box member 60, with a threaded portion 61 and 63 and a pin member 82 with a threaded portion 80 and 84. The threaded portions are wedge threads and are formed on two distinct tapers that are offset diametrically and parallel, with an interruption to form seals.

The pin member 82 threaded portions 80 and 84, make up the pin member 82 with the box member 60. The box member 60 has a mid-seal between the threaded portions. The pin member 82 has a mid-seal between the threaded portions. As will be understood, the threaded portions 80 and 84 may interface with other threaded portions 61 and 63 of the box member 60. As will be understood, and as described in the claims, threaded portions 80 and 84 may be labeled as "first" or "second" threaded portions while corresponding threaded portions 61, 63 may also be labeled as "first" or "second".

Figure 1A:
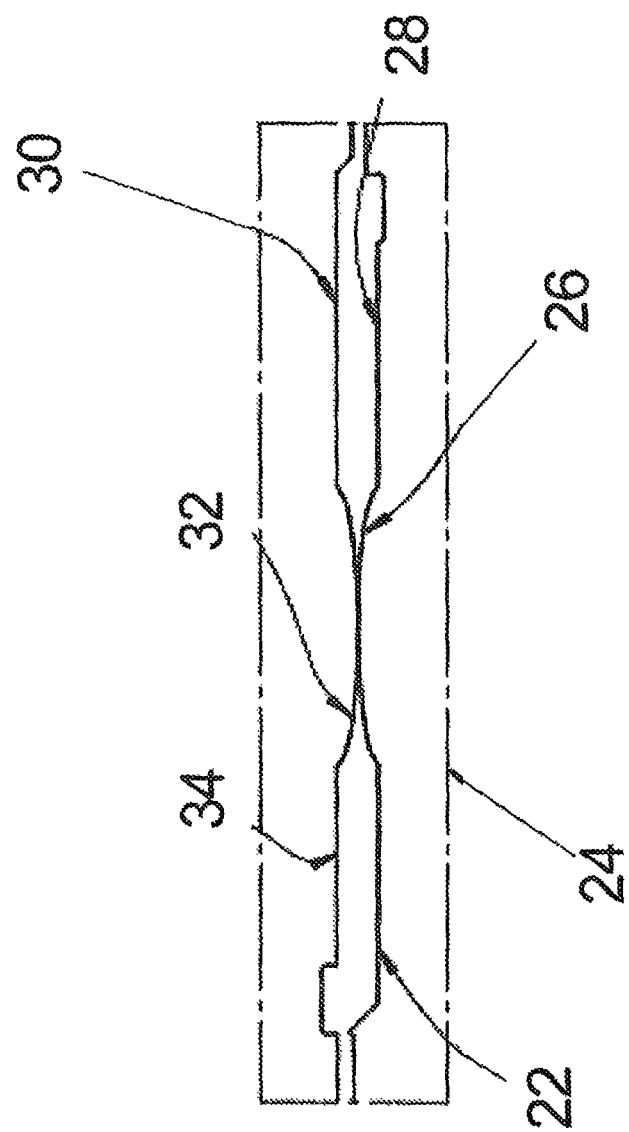
FIG. 1A is a side cross-sectional view of a box, and pin arrangement of FIG. 1 in a "semi-tight" configuration.

Referring to FIG. 1A, two portions of a coupling are presented wherein a "contact" position is established between respective seal portions of the pin and box. An enlarged view of the mid seal area of FIG. 1 is illustrated. When established in a "completed connection" configuration, the resulting coupling may withstand forces placed upon the connection. Components related to the "pin" are listed as 22, 24, 26 and 28. Components related to the "box" are listed as 30, 32 and 34. The pin exterior surface is configured with a cylindrical surface 22 that progresses to a mid-seal area 24. The mid seal area 24 transitions to a pin member seal 26 that is configured to interface with a box member seal 32. The box portion of the coupling has a cylindrical surface 30 that extends to the box member seal 32 and another cylindrical surface 34. As will be understood, connection of the pin member seal 26 and the box member seal 32 establish the connection to be leak tight. As will be understood, the pin member seal 26 is constructed between the two cylindrical surfaces 30, 22.

Figure 1B:
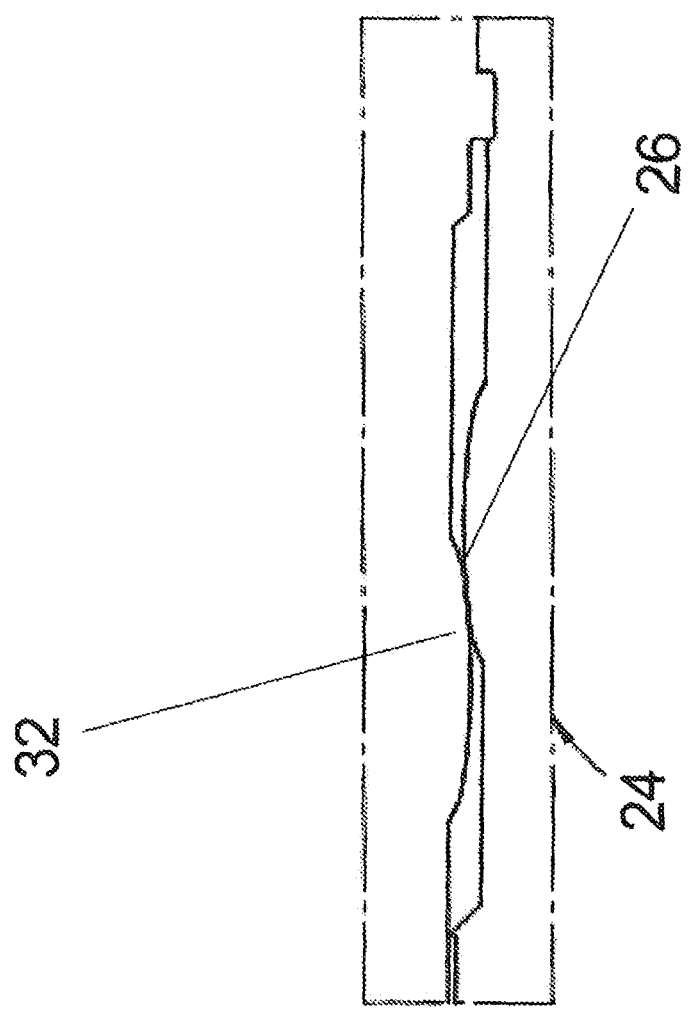
FIG. 1B is a side cross-sectional view of the box and pin arrangement of FIG. 1 in a tight configuration.
Figure 1C:
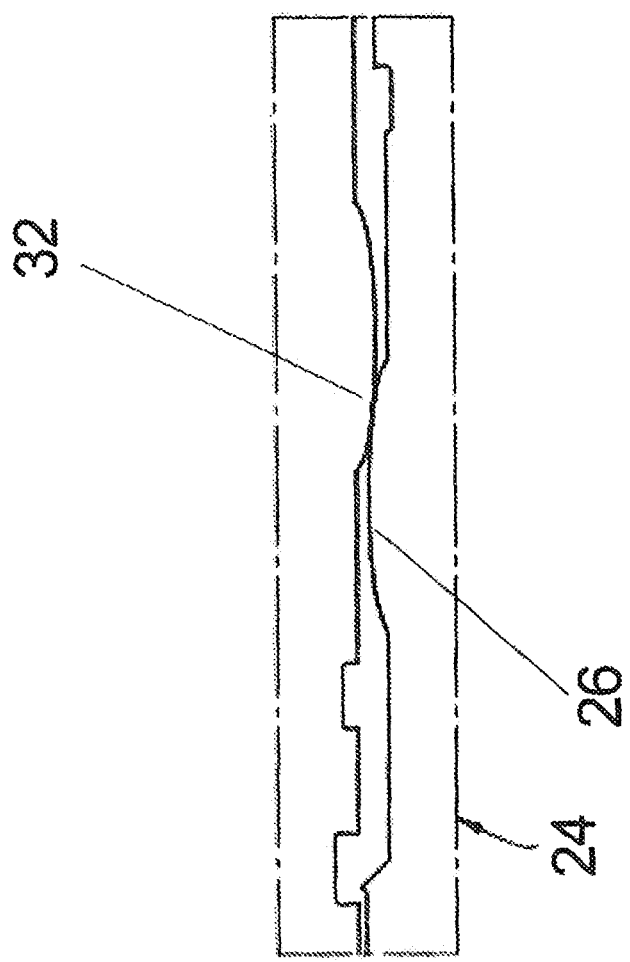
FIG. 1C is a side cross-sectional view of the box and pin arrangement of FIG. 1 in a loose condition.

Referring to FIG. 1B, a "tight" position of the box and pin of FIG. 1 is illustrated. In this position, the pin member seal 26 and the box member seal 32 are touching, wherein the forward areas of the seals 26, 32 contact. Such a configuration occurs when the pin is rotated relative to the box. Thus, while tightening, in a chronological order, FIG. 1C occurs first (the "loose" position), followed by a "semi" tight position in FIG. 1A, followed by a "tight" position in FIG. 1B. The pin member 82 has moved forward axially into the box 60 due to axial distance variations inherent in wedge threads due to tolerances. The pin member 82 has moved past the idea mated position of FIG. 1A. Referring to FIG. 1C, the back areas of the pin member seal 26 and the box member seal 32 are in contact. In FIG. 1B, this connection would be a "tight" connection where a fully torqued configuration would be present.

Figure 2:
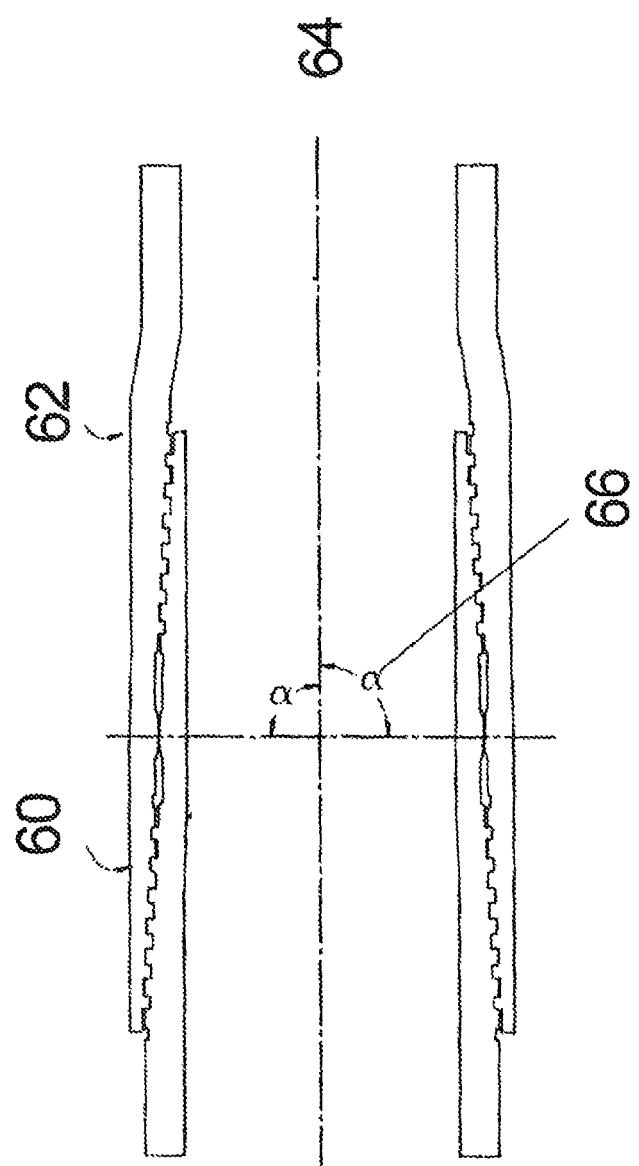
FIG. 2 is a side cross-sectional view of a box and pin arrangement of FIG. 1 with a defined α angle.

Referring to FIG. 2, depicts a tubular sectional profile with a longitudinal central axis 64 and a threaded connection profile 62. In this embodiment, an angle α 66 is illustrated, which is the angle between a longitudinal central axis 64 of the connection and the mid-point of the combination of the box member seal 32 and the pin member seal 26. A threaded connection profile 62 of the box member 60 has a complex profile that decreases in diameter. The angle α is at a right angle (90 degrees) from the longitudinal central axis 64. The axis 64, described by α, crosses the seal area which is depicted in more detail in FIGS. 6 and 7. Both the longitudinal central axis and the angle α are crucial to constructing the box member seal 32 and pin member seal 26 of FIG. 1A.

Figure 3:
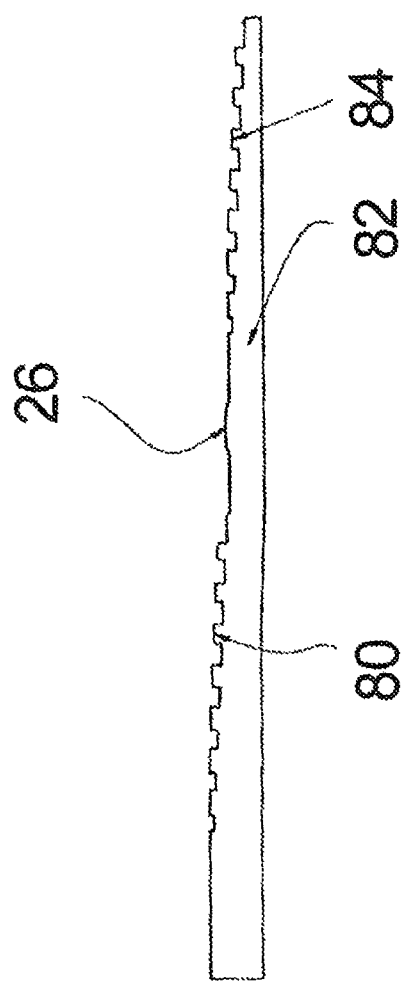
FIG. 3 is a side cross-sectional view of a pin member of FIG. 1.

Referring to FIG. 3, a cross-section of the pin member 82 of the configuration of FIG. 1 is illustrated. The pin member 82 is depicted in an unmated embodiment for clarity. The pin member 82 is configured with a first threaded portion 80 and a second threaded portion 84 that is configured to interface with a corresponding threaded portion of the box member 60. As will be understood, portions of an established connection are omitted for clarity of illustration of the pin member 82 components only. The threaded portions 80, 84 are wedge threads and are formed on two distinct tapers that are offset diametrically and are parallel.

Figure 4:
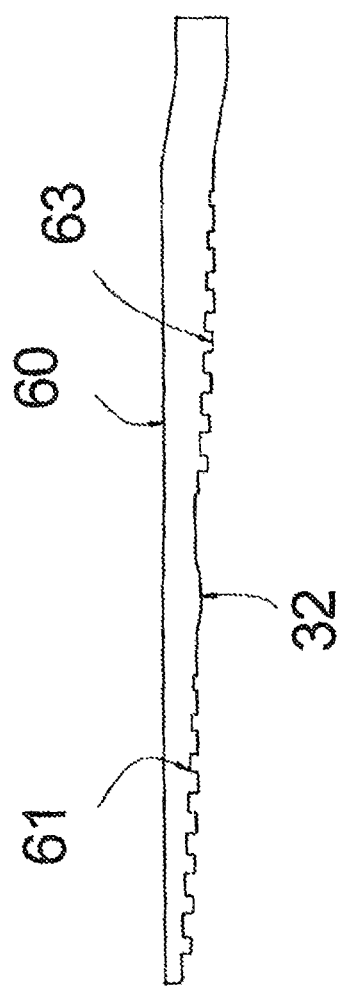
FIG. 4 is a side cross-sectional view of the box member of FIG. 1.

Referring to FIG. 4, a cross-sectional view of the box member 60 is illustrated. The box member provides a first threaded portion 61 and a second threaded portion 63. As provided in the cross-sectional view, the box member seal 32 is positioned between the first threaded portion 61 and the second threaded portion 63. In the illustrated embodiment, the box member seal 32 is provided in a convex arrangement. As will be understood, portions of an established connection are omitted for clarity of illustration of the box member 60 components only. The threaded portions 61, 63 are wedge threads and are formed on two distinct tapers that are offset diametrically and are parallel.

Figure 5:
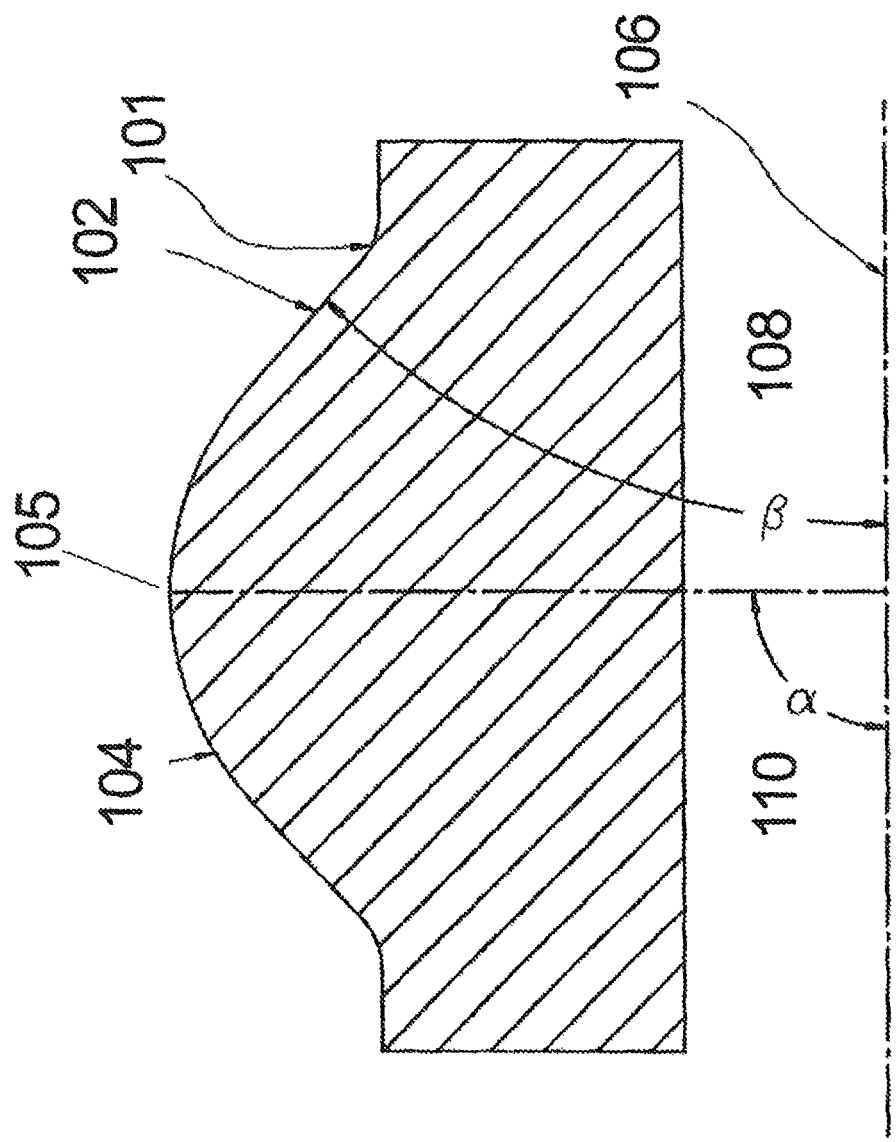
FIG. 5 is a side cross-sectional view of a seal that may be used in the arrangement of FIG. 1.
Figure 6:
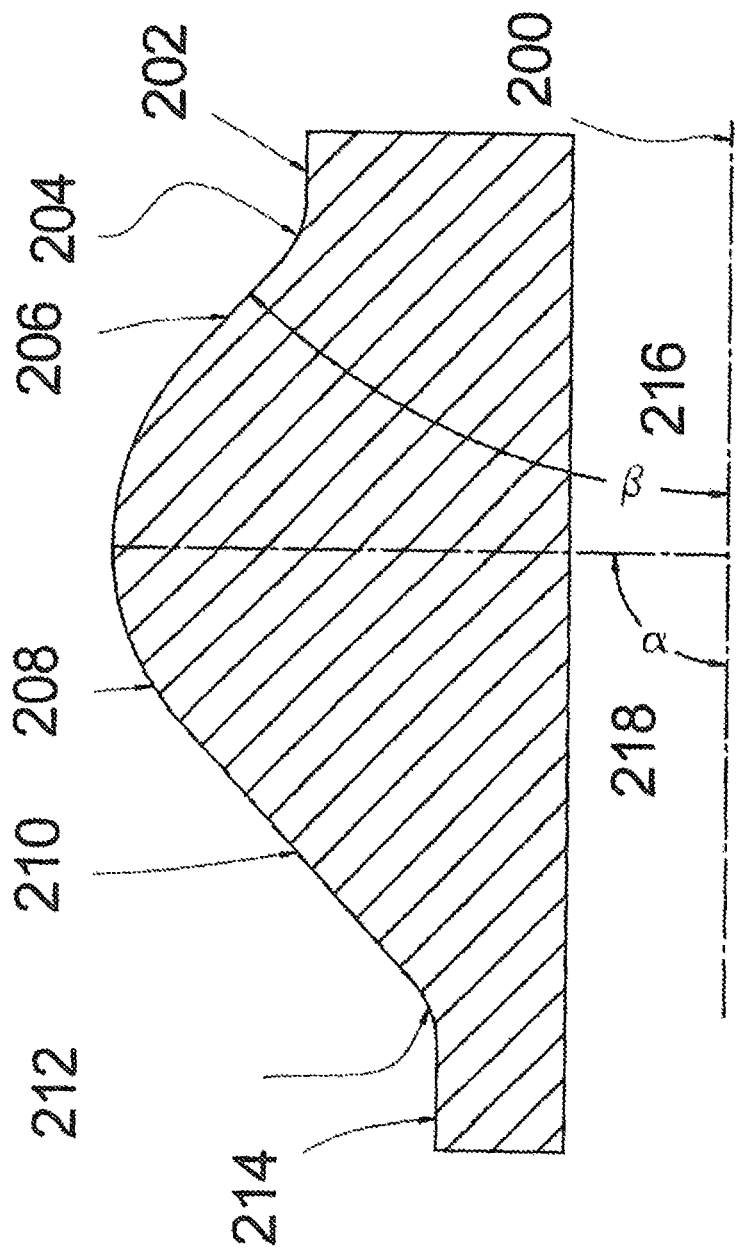
FIG. 6 is a second side cross-sectional view of a seal that may be used in the arrangement of FIG. 1.

Referring to FIGS. 5 and 6, seal profiles are illustrated. The seal profile disclosed in FIG. 5 may be used in the pin member seal 26 or in the box member seal 32. In a similar manner, the seal profile in FIG. 6 may be used in the pin member seal 26 or the box member seal 32. To this end, embodiments may use either of the seal embodiments for either of the pin member seal 26 and the box member seal 32. Details of the seal profiles are recited below.

Referring to FIG. 5, one example embodiment of a seal profile with a pronounced radial seal 105. The pronounced radial seal 105 is provided wherein the seal 105 has a radial blend 101 that transitions to a tangent blend 102. An equal and opposite profile is present on each side of the apex of the seal 105. As measured with an axis of radius centerpoint 106, an angle β as measured between the axis 106 and the surface of the seal 105. Also as measured from the axis of radius centerpoint 106, an angle α is measured to the apex of the seal 105.

Referring to FIG. 6, a second seal profile is illustrated. A radial seal 208 is provided that has several features that allow this seal 208 to be used in the embodiments described above. From the apex of the seal 208, a tangent blend 206 portion extends down to a radial blend 204 and a cylindrical surface 202. On the other angular declining side of the radial seal 208, the seal radial profile 210 extends down to a second radial blend 214. The apex of the seal 208 defines one axis to which an angle α 218 is measured to an axis of radius centerpoint 200 is measured. The angle α 218 is defined as 90 degrees. An angle β 216 is also measured from the axis of radius centerpoint 200 to the apex for cylindrical side of the radial seal 208.

Figure 7:
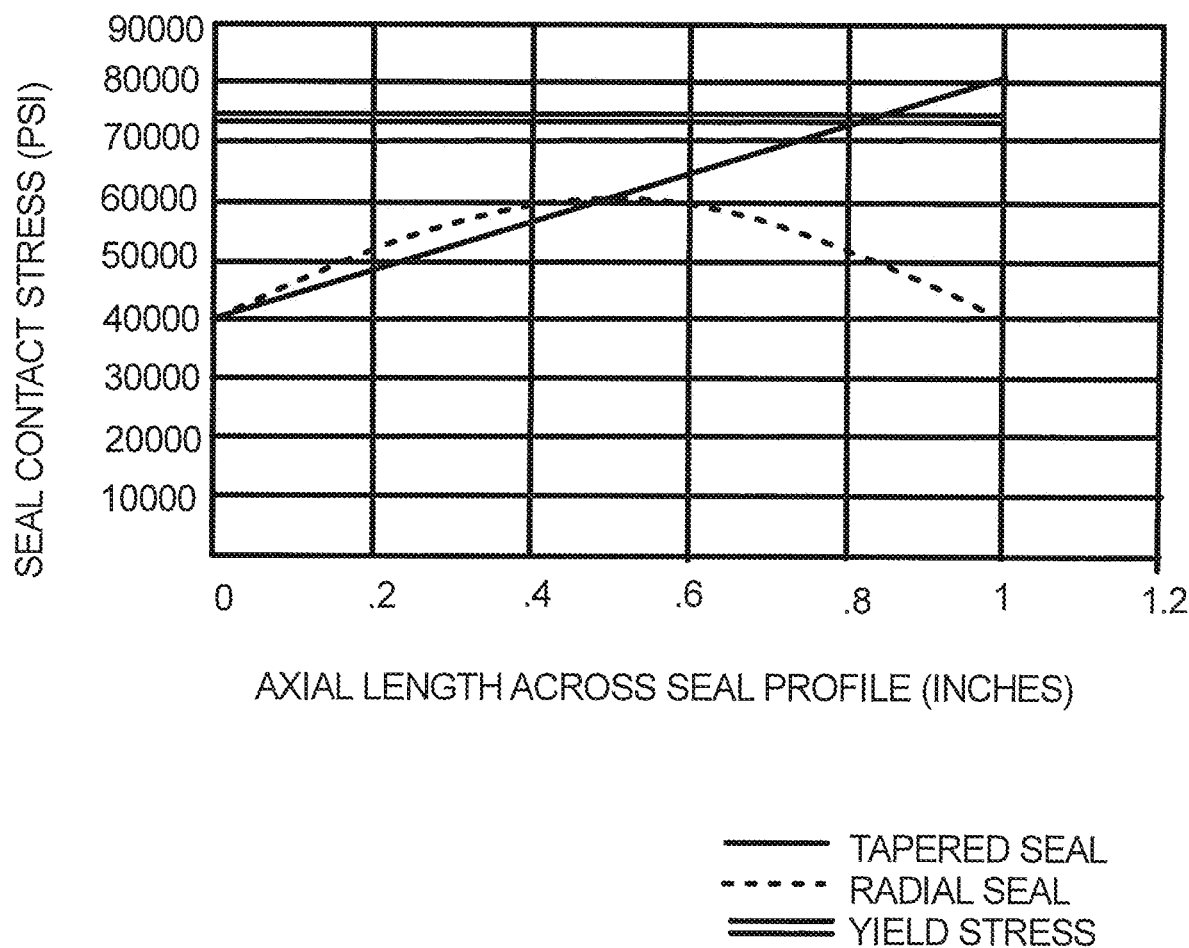
FIG. 7 is a stress graph for tapered and radial seal configurations, as measured per unit length across a seal profile.

Referring to FIG. 7, a stress diagram is illustrated for the embodiments described in the FIGS. Specifically, the x axis provides an axial length across a seal profile (in inches) vs. a seal contact stress in pounds per square inch. To this end, use of a tapered seal provides a straight line relationship, while a radial seal provides a parabolic graph, with an apex centered around 60,000 psi. Thus, as length progresses a tapered seal exceeds the material yield stress leading to the tapered seals destruction. As will be understood, such vast improvements in controlling seal contact stress over an axial progression prevents the destruction of the seal. This allows for a more robust seal for couplings using threaded portions with wedge threads.

Figure 8:
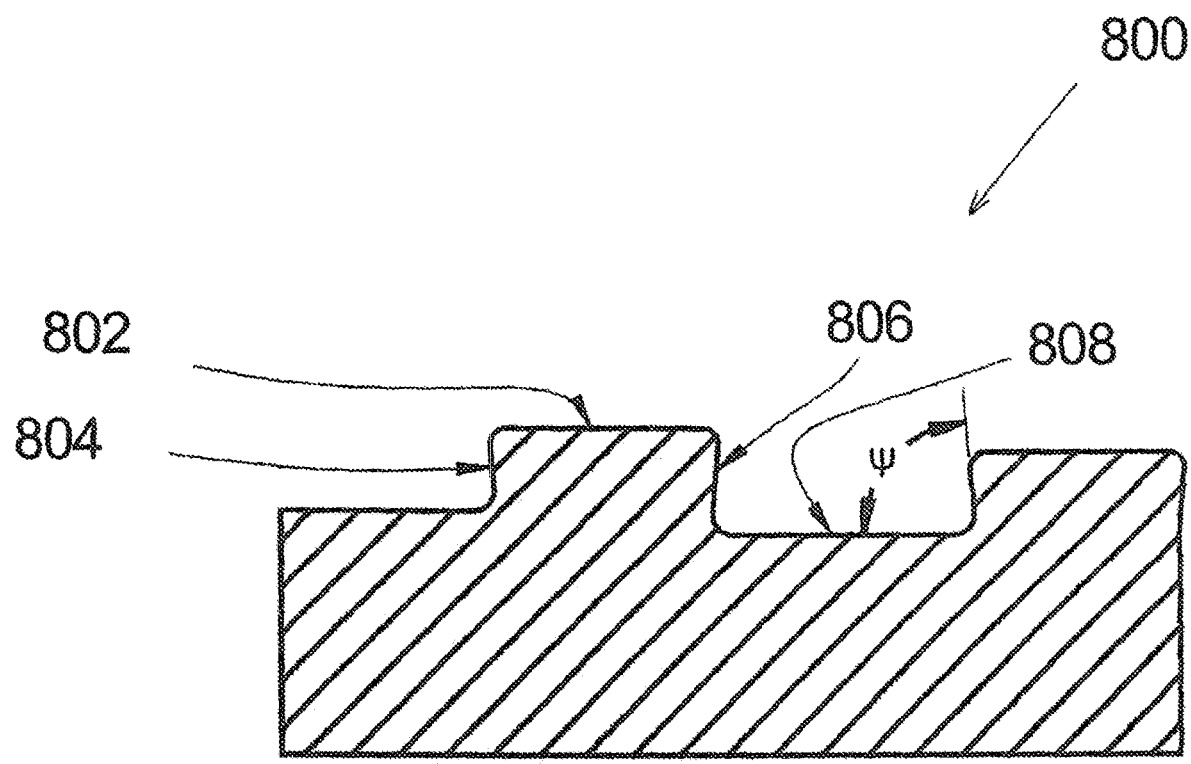
FIG. 8 is a side elevational view of a typical thread used in the configurations providing a threaded connection.

Referring to FIG. 8, a side cross-sectional view of a typical thread used in the embodiments of the coupling are illustrated. A thread form profile 800 is provided such that a thread crest 802 is present at the top of the profile 800. The respective sides of the profile are a load flank 804 and a stab flank 806. A thread root 808 is exposed, at the base of the load flank 804 and stab flank 806.

As will be understood, aspects of the disclosure provide for a coupling that does not have the drawbacks of frustoconical apparatus described above. The coupling may be readily constructed in an economical method. The coupling further is easily understandable by field personnel thereby limiting field training and possible human error during installation.

Figure 9:
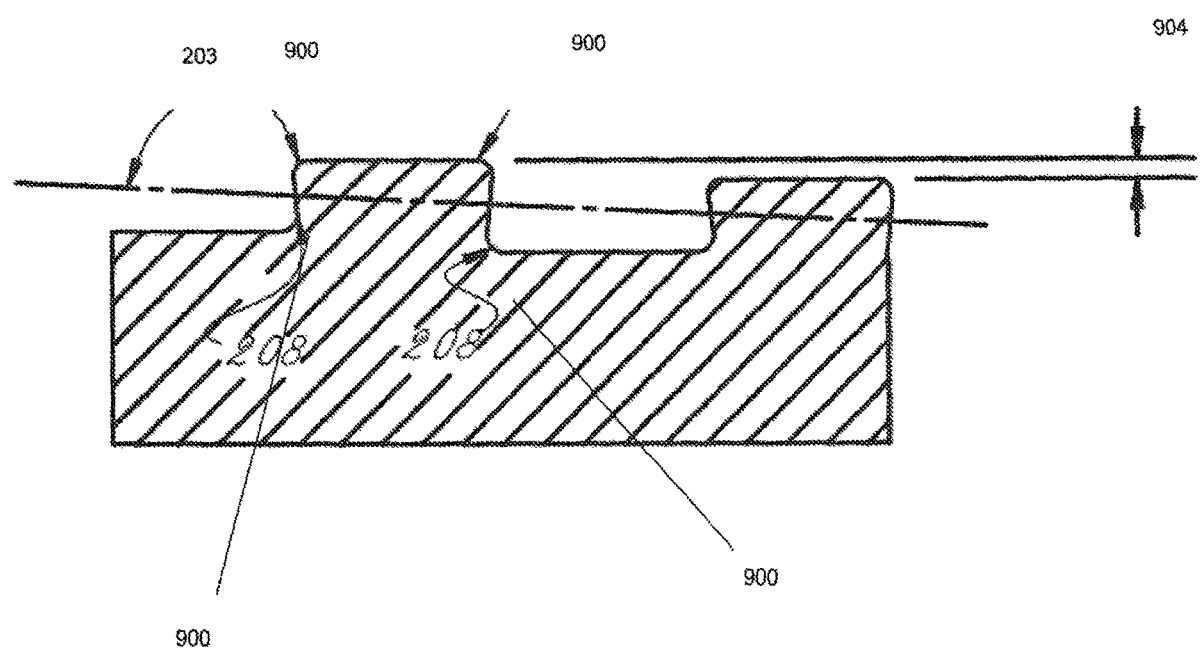
FIG. 9 is a side elevational view of a thread form profile in one example embodiment.

Referring to FIG. 9, a thread form profile of FIG. 8 is illustrated. Corner radii 900 are provided in the profile. A taper 203 for the threads is provided as illustrated. A pitch line is presented passing through the load flanks 804 (described in FIG. 8) and a thread step 904. As illustrated, flat crests 802 are provided for the threads. The thread step 904 is present due to the flat thread crest 802 (present in FIG. 8) and flat thread root 808 being formed on a tapered plane.

In one embodiment, a coupling is described. The coupling may comprise a box member with at least one opening in the box member, the box member comprising a first curvilinear surface, the box member configured with a first set of box member threads and a second set of box member threads. The coupling may further comprise a pin member configured to be inserted into the box member comprising a second curvilinear surface. The coupling may be further configured wherein the pin member is configured with a first set of pin member threads and a second set of pin member threads. In this embodiment, the first curvilinear surface and the second curvilinear surface are configured to interface and wherein the first curvilinear surface and the second curvilinear surface share a same longitudinal central axis. The coupling may be configured wherein an apex of one of the first curvilinear surface and the second curvilinear surface is configured such that an axial placement limits a diametric interference between the first curvilinear surface and the second curvilinear surface. The coupling may also be configured wherein a radial seal is formed from an intersection of the first curvilinear surface and the second curvilinear surface and wherein the first set of box member threads is configured to form a first interface with the first set of pin member threads and the second set of box member threads is configured to form a second interface with the second set of member threads.

In one embodiment, a coupling is described. The coupling may comprise a box member with at least one opening in the box member, the box member comprising a first curvilinear surface, the box member configured with a first set of box member threads and a second set of box member threads. The coupling may further comprise a pin member configured to be inserted into the box member. The coupling may further comprise a second curvilinear surface, and wherein the pin member is configured with a first set of pin member threads and a second set of pin member threads. The coupling may be further configured wherein the first curvilinear surface and the second curvilinear surface are configured to interface, wherein the first curvilinear surface and the second curvilinear surface share a same longitudinal central axis. The coupling may be further configured wherein an apex of one of the first curvilinear surface and the second curvilinear surface is configured such that an axial placement limits a diametric interference between the first curvilinear surface and the second curvilinear surface and wherein a radial seal is formed from an intersection of the first curvilinear surface and the second curvilinear surface. The coupling may be further configured wherein the first set of box member threads is configured to form a first interface with the first set of pin member threads and the second set of box member threads are configured to form a second interface with the second set of member threads. The coupling may be configured wherein the coupling is configured such that when torque is applied to one of the box member and the pin member, the seal moves from a point of maximum radial interference to a lower minimum interference.

In another embodiment, a coupling is described. In this embodiment, a box member with at least one opening in the box member is described wherein the box member comprises a first curvilinear surface, the box member configured with a first set of box member threads and a second set of box member threads. The coupling may further comprise a pin member configured to be inserted into the box member comprising a second curvilinear surface. The coupling may be further configured wherein the pin member is configured with a first set of pin member threads and a second set of pin member threads. The coupling may be further configured wherein the first curvilinear surface and the second curvilinear surface are configured to interface, wherein the first curvilinear surface and the second curvilinear surface share a same longitudinal central axis. The coupling is further configured wherein an apex of one of the first curvilinear surface and the second curvilinear surface is configured such that an axial placement limits a diametric interference between the first curvilinear surface and the second curvilinear surface. The coupling is further configured wherein a radial seal is formed from an intersection of the first curvilinear surface and the second curvilinear surface and wherein the first set of box member threads is configured to form a first interface with the first set of pin member threads. The coupling is further configured wherein the second set of box member threads is configured to form a second interface with the second set of member threads, and wherein at least one of the first set of pin member threads, the second set of pin member threads, the first set of box member threads and the second set of box member threads are tapered threads.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included, within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A coupling, comprising:
   a box member with at least one opening in the box member, the box member comprising a first curvilinear surface, the box member configured with a first set of box member threads and a second set of box member threads; and
   a pin member configured to be inserted into the box member comprising a second curvilinear surface, and wherein the pin member is configured with a first set of pin member threads and a second set of pin member threads, wherein the first curvilinear surface and the second curvilinear surface are configured to interface, wherein the first curvilinear surface and the second curvilinear surface share a same longitudinal central axis, and wherein an apex of one of the first curvilinear surface and the second curvilinear surface is configured such that an axial placement limits a diametric interference between the first curvilinear surface and the second curvilinear surface, and wherein a radial seal is formed from an intersection of the first curvilinear surface and the second curvilinear surface, wherein each of the first curvilinear surface and the second curvilinear surface have a radial blend and a tangent blend and wherein the first set of box member threads is configured to form a first interface with the first set of pin member threads and the second set of box member threads is configured to form a second interface with the second set of member threads.

2. The coupling according to claim 1, wherein, the radial seal is located between the first interface and the second interface.

3. The coupling according to claim 1, wherein the first set of box member threads, the second set of box member threads, the first set of pin member threads and the second set of pin member threads are wedge threads.

4. The coupling according to claim 1, wherein the radial seal is configured between an outside dimension and an inner dimension of the coupling.

5. The coupling according to claim 1, further comprising a mid-seal area.

6. The coupling according to claim 5, wherein the mid-seal area is configured between the first interface and the second interface.

7. A coupling, comprising:
a box member with at least one opening in the box member, the box member comprising a first curvilinear surface, the box member configured with a first set of box member threads and a second set of box member threads; and
a pin member configured to be inserted into the box member comprising a second curvilinear surface, and wherein the pin member is configured with a first set of pin member threads and a second set of pin member threads, wherein the first curvilinear surface and the second curvilinear surface are configured to interface, wherein the first curvilinear surface and the second curvilinear surface share a same longitudinal central axis, and wherein an apex of one of the first curvilinear surface and the second curvilinear surface is configured such that an axial placement limits a diametric interference between the first curvilinear surface and the second curvilinear surface and wherein a radial seal is formed from an intersection of the first curvilinear surface and the second curvilinear surface, wherein each of the first curvilinear surface and the second curvilinear surface have a radial blend and a tangent blend and wherein the first set of box member threads is configured to form a first interface with the first set of pin member threads and the second set of box member threads is configured to form a second interface with the second set of member threads and wherein the coupling is configured such that when torque is applied to one of the box member and the pin member, the seal moves from a point of maximum radial interference to a lower minimum interference.

8. The coupling according to claim 7, wherein the radial seal is located between the first interface and the second interface.

9. The coupling according to claim 7, wherein, the first set of box member threads, the second set of box member threads, the first set of pin member threads and the second set of pin member threads are wedge threads.

10. The coupling according to claim 7, wherein the radial seal is configured between an outside dimension and an inner dimension of the coupling.

11. The coupling according to claim 7, further comprising a mid-seal area.

12. The coupling according to claim 11, wherein the mid-seal area is configured between the first interface and the second interface.

13. A coupling, comprising:
a box member with at least one opening in the box member, the box member comprising a first curvilinear surface, the box member configured with a first set of box member threads and a second set of box member threads; and
a pin member configured to be inserted into the box member comprising a second curvilinear surface, and wherein the pin member is configured with a first set of pin member threads and a second set of pin member threads, wherein the first curvilinear surface and the second curvilinear surface are configured to interface, wherein the first curvilinear surface and the second curvilinear surface share a same longitudinal central axis, and wherein an apex of one of the first curvilinear surface and the second curvilinear surface is configured such that an axial placement limits a diametric interference between the first curvilinear surface and the second curvilinear surface and wherein a radial seal is formed from an intersection of the first curvilinear surface and the second curvilinear surface and wherein the first set of box member threads is configured to form a first interface with the first set of pin member threads and the second set of box member threads is configured to form a second interface with the second set of member threads, wherein each of the first curvilinear surface and the second curvilinear surface have a radial blend and a tangent blend and wherein at least one of the first set of pin member threads, the second set of pin member threads, the first set of box member threads and the second set of box member threads are tapered threads.

14. The coupling according to claim 13, wherein hoop stresses from the coupling when torqued are one of negated and mitigated.

15. The coupling according to claim 13, wherein the radial seal is located between the first interface and the second interface.

16. The coupling according to claim 13, wherein, the first set of box member threads, the second set of box member threads, the first set of pin member threads and the second set of pin member threads are wedge threads.

17. The coupling according to claim 13, wherein the radial seal is configured between an outside dimension and an inner dimension of the coupling.

18. The coupling according to claim 13, further comprising a mid-seal area.

19. The coupling according to claim 18, wherein the mid-seal area is configured between the first interface and the second interface.

* * * * *